US006747272B2

(12) United States Patent
Takahashi

(10) Patent No.: US 6,747,272 B2
(45) Date of Patent: Jun. 8, 2004

(54) METHOD AND APPARATUS FOR ANALYZING MASS SPECTRUM

(75) Inventor: Yutaka Takahashi, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 10/403,986

(22) Filed: Mar. 31, 2003

(65) Prior Publication Data

US 2003/0213902 A1 Nov. 20, 2003

(30) Foreign Application Priority Data

Apr. 1, 2002 (JP) ....................................... 2002-098271
Aug. 15, 2002 (JP) ....................................... 2002-236790
Mar. 12, 2003 (JP) ....................................... 2003-066358

(51) Int. Cl.[7] ........................... B01D 51/44; H01J 49/00
(52) U.S. Cl. ......................... 250/282; 436/161; 435/7.1
(58) Field of Search ......................... 250/282; 436/161; 435/7.1

(56) References Cited

U.S. PATENT DOCUMENTS 6,579,720 B1 * 6/2003 Pidgeon et al. ............. 436/161

* cited by examiner

*Primary Examiner*—John R. Lee
*Assistant Examiner*—Erin-Michael Gill
(74) *Attorney, Agent, or Firm*—Webb Ziesenheim Logsdon Orkin & Hanson, P.C.

(57) ABSTRACT

A novel method and apparatus for analyzing a mass spectrum having the peaks of impurity adduct ions. The molecular weight of the sample molecule is determined based on the mass-to-charge ratios of the detected adduct ions. In addition, the peaks of the detected adduct ions are deleted from the detected data. Peaks of a given height are added to peak positions of molecular ions corresponding to the adduct ions. Then, a database search is performed.

28 Claims, 12 Drawing Sheets

THE COMPARISON OF EI SPECTRUM OF TOLUENE (TOP) WITH LIBRARY SPECTRUM (BOTTOM)

THE COMPARISON OF ESI-IN SOURCE CID SPECTRUM OF RESERPINE (FIG.2(a)) WITH LIBRARY SPECTRUM (FIG.2(b))

| IONIZATION METHOD | POLARITY | MOBILE PHASE SOLVANT | ADDUCT IONS | M/Z DIFFERENCE |
|---|---|---|---|---|
| ESI | + | methanol | $[M+H]+$, $[M+NH_4]+$, $[M+Na]+$ | 17, 22, 5 |
| ESI | + | acetonitrile | $[M+H]+$, $[M+NH_4]+$ | 17 |
| ESI | + | with ammonium acetate | $[M+H]+$, $[M+NH_4]+$ | 17 |
| ESI | + | amine type | $[M+H]+$, $[M+H+N(CH_2CH_3)_3]+$ | 101 |
| APCI | + | methanol | $M+H]^+$, $[M+H+CH_3OH]^+$ | 32 |
| APCI | + | acetonitrile | $[M+H]^+$, $[M+H+CH_3CN]^+$ | 41 |
| APCI | + | with amonium acetate | $[M+H]^+$, $[M+NH_4]^+$ | 17 |
| APCI | + | amine type | $[M+H]^+$, $[M+H+N(CH_2CH_3)_3]^+$ | 101 |
| ESI | - | with no acid | $[M-H]^-$, $[M+Cl]^-$ | 36.5 |
| ESI | - | acetic acid type | $[M-H]^-$, $[M+CH_3COO]^-$ | 60 |
| ESI | - | with formic acid | $[M-H]^-$, $[M+HCOO]^-$ | 46 |
| ESI | - | with triflouro-acetic acid | $[M-H]^-$, $[M+CF_3COO]^-$ | 114 |
| APCI | - | with no acid | $[M-H]^-$, $[M+Cl]^-$ | 36.5 |
| APCI | - | acetic acid type | $[M-H]^-$, $[M+CH_3COO]^-$ | 60 |
| APCI | - | with formic acid | $[M-H]^-$, $[M+HCOO]^-$ | 46 |
| APCI | - | with triflouro-acetic acid | $[M-H]^-$, $[M+CF_3COO]^-$ | 114 |

FIG. 4

RESULT OF SPECTRAL ANALYSIS

NO ION WAS DETECTED

BY CHANGING POLARITY CONDITION OR
THE OTHER ANALYSIS CONDITIONS, PLEASE MEASURE AGAIN

FIG. 6(b)

RESULT OF SPECTRAL ANALYSIS

SINGLE PEAK WAS DETECTED AT
THE POSITION OF m/z=500

JUDGING FROM THE ANALYSIS CONDITION,
THE PEAK MAY BE ASSIGNED TO $[M+H]^+$ OR
$[M+H+CH_3CN]^+$

TO DETERMINE THE MOLECULAR WEIGHT, PLEASE
MEASURE AGAIN AFTER CHANGING POLARITY CONDITION
OR AFTER SELECTING THE OTHER ANALYSIS CONDITIONS

FIG. 6(c)

THE COMPARISON OF RECONSTRUCTED ESI-IN SOURCE CID SPECTRUM OF RESERPINE (FIG.9(a)) WITH LIBRARY SPECTRUM (FIG.9(b))

METHOD AND APPARATUS FOR ANALYZING MASS SPECTRUM

BACKGROUND OF THE INVENTION

1. Field of the Invention

The present invention relates to a method and apparatus for analyzing spectra obtained by a mass spectrometer and, more particularly, to a method and apparatus for analyzing spectra obtained by mass-analyzing ions to which molecules of a mobile phase solvent or impurities contained in the solvent are attached.

2. Description of Related Art

Where the masses of molecules (hereinafter referred to as sample molecules indicated by M) contained in a sample are analyzed using a mass spectrometer, the sample is ionized. Various methods are available for the ionization. In one of these methods, ions of the sample molecules with mobile phase solvent or impurities contained in the solvent attached to the sample molecules are generated by ionization.

A typical example of such ionization method is atmospheric pressure ionization (API) used as an interface between a liquid chromatograph (LC) and a mass spectrometer (MS).

Two kinds of API methods are available: electrospray ionization (ESI) and atmospheric-pressure chemical ionization (APCI). In either method, ionization is performed by movement of protons between sample molecules and molecules of a mobile phase solvent, such as methanol, acetonitrile, or acetic acid.

Where positive ions are detected by a mass spectrometer, protonated ions $[M+H]^+$consisting of sample molecules M to which protons $H^+$are attached are detected. Where negative ions are detected by a mass spectrometer, deprotonated ions $[M-H]^-$consisting of sample molecules M from which protons $H^+$have been abstracted are detected.

If ions produced by API are only either protonated ions $[M+H]^+$or deprotonated ions $[M-H]^-$, no serious problems take place. It is known, however, that adduct ions are generated in addition to protonated or deprotonated ions where molecules of mobile phase solvent or impurities contained in it are attached to sample molecules and that such adduct ions are detected by mass spectrometry and often appear in spectra.

Ions where molecules of a mobile phase solvent or impurities contained in it are attached to sample molecules as mentioned above are hereinafter referred to as impurity adduct ions. Impurity adduct ions, protonated ions, and deprotonated ions are collectively referred to as adduct ions. For example, in protonated ions, protons are adducts. In impurity adduct ions $[M+NH_4]^+$, ammonium ions are adducts as described later. Also, with respect to deprotonated ions, protons are conveniently referred to as adducts.

For example, where ionization is done by ESI using methanol as a mobile phase solvent and positive ions are detected by a mass spectrometer, it is empirically known that positive impurity adduct ions $[M+NH_4]^+$and/or $[M+Na]^+$are sometimes detected in addition to protonated ions $[M+H]^+$. In the ions $[M+NH_4]^+$, ammonium ions are attached to sample molecules M. In the ions $[M+Na]^+$, sodium ions are attached to sample molecules M.

It is also empirically known that where methanol is used as a mobile phase solvent, ionization is performed by APCI, and positive ions are detected by mass spectrometry, positive impurity adduct ions $[M+H+CH_3OH]^+$where protons $H^+$and methanol molecules are attached to sample molecules M are sometimes detected in addition to protonated ions $[M+H]^+$.

Furthermore, it is experimentally known that where a sample is ionized by ESI using formic acid as a mobile phase solvent and negative ions are detected by mass spectrometry, negative impurity adduct ions $[M+HCOO]^-$where formic acid ions are attached to sample molecules M are sometimes detected in addition to deprotonated ions $[M-H]^-$.

Where samples are ionized by API and mass analyzed in this way, peaks of impurity adduct ions appear in the resulting spectrum, in addition to peaks of protonated or deprotonated ions. This often makes it difficult to judge the molecular weight of the sample molecules based on the spectrum or to analyze the spectrum.

Accordingly, it is quite difficult to analyze spectra obtained by ionizing samples by API and mass analyzing them. Therefore, a rich amount of experience is necessary to determine the molecular weight of sample molecules based on the spectrum or to analyze the spectrum. In addition, there is even the problem that the results of spectral analysis differ according to the degree of experience of each analyst.

The case where ionization is performed by API has been described thus far. Impurity adduct ions may also be generated where ionization is performed by methods other than API, e.g., chemical ionization (CI), fast atom bombardment (FAB), matrix assisted laser desorption (MALDI), and field desorption (FD). Where mass spectra obtained by these ionization methods are analyzed, similar problems take place. This is a first problem that the present application tackles.

Spectra obtained by ionizing samples by the aforementioned various ionization methods and mass analyzing them are compared with a very large number of mass spectra registered in a commercially available library, or database, of mass spectral data to identify the chemical formulas of observed ions. However, such registered mass spectra have all been derived by electron impact (EI) ionization that is a hard ionization method. Its feature is that the peaks of each individual molecular ion $[M]^+$charged positively by release of one electron from each sample molecule are distributed in the highest mass-charge ratio (m/z) region of the resulting spectrum while peaks of fragment ions produced by fragmentation of molecular ions $[M]^+$are distributed in a lower m/z region than the molecular ions. One example is a mass spectrum of toluene as shown in FIG. 1. This spectrum is a bar-type spectrum in which the peaks of a measured mass spectrum are data processed and represented as a bar graph. That is, each peak is represented in terms of a bar.

Such a library, or database, of mass spectra owing to EI is generally applied to mass spectra obtained by a GC/MS instrument that is a combination of a gas chromatograph and a mass spectrometer. In a GC/MS measuring system, peaks of adduct ions are not contained at all in mass spectra. Consequently, where samples ionized by soft ionization methods, such as API, CI, FAB, MALDI, and FD are compared with mass spectra which are obtained by a mass spectrometer and contain many peaks of adduct ions, pattern mismatch occurs frequently, even if they are mass spectra of the same compound.

Where samples are ionized by El, molecular ions $[M]^+$that are charged positively by release of one electron from each sample molecule are observed routinely. However, mass spectra obtained by ionizing samples by a soft ionization method such as API, CI, FAB, MALDI, or FD and detecting the resulting ions by a mass spectrometer contain almost no such molecular ions $[M]_+$.

Where API, CI, FAB, MALDI, or FD is used, fragment ions are not readily produced because of a soft ionization method. Yet, fragment ions can be produced by ESI or APCI by using in-source CID or in-source fragmentation that produces fragment ions by applying a voltage of tens of volts to the ion introduction port (orifice) of the vacuum region from the atmospheric-pressure ionization region to momentarily accelerate ions for collision with atmospheric gas.

FAB is a somewhat harder ionization method than ESI and APCI and, therefore, fragment ions are often produced depending on the nature of the measured compound.

Where mass spectra are obtained by a soft ionization method as described, if the measurement is performed by in-source CID, spectra having many fragment ions can be derived. Yet, there is the problem that the hit (match) rate is low when a search is done, because the patterns are widely different from those of mass spectra of the same compounds registered in commercially available libraries, or databases.

The reason why the hit rate is so low lies in the existence of adduct ions, such as $[M+H]^+$, $[M+Na]^+$, $[M+NH_4]^+$, and $[M+H+solvent]^+$which are observed in LC/MS mass spectra obtained by a soft ionization method and which are in a higher mass region than $[M]^+$ions. One example is a mass spectrum of reserpine as shown in FIG. 2. Therefore, it is required to construct a new general-purpose database that is dedicated for LC/MS applications and different from databases for GC/MS applications. However, mass spectra obtained by LC/MS using ion source structures fabricated by different instrument manufactures are different somewhat from each other because the source structures are subtly different from each other.

Accordingly, it can be hardly expected that an LC/MS database is constructed which has a high degree of generality and can be applied to instruments of all manufactures such as the existing GC/MS libraries. Nonetheless, it is not realistic to construct a database made up of tens of thousands of items for each manufacturer if time and labor are considered. This is a second problem that the present application tackles.

SUMMARY OF THE INVENTION

Accordingly, in view of the foregoing, it is a first object of the present invention to provide a novel method and apparatus permitting one to easily analyze mass spectra containing peaks of impurity adduct ions without skill.

It is a second object of the present invention to provide a novel method and apparatus for analyzing LC/MS mass spectra obtained by a soft ionization method, based on a commercially available, general-purpose GC/MS database constructed by EI.

A first method of analyzing a mass spectrum in accordance with the present invention achieves the above-described first object and comprises the steps of: comparing entered information about an ionization method, a detection polarity used by a mass spectrometer, and a mobile phase solvent with information registered in a database portion about ionization methods, detection polarities used by the mass spectrometer, mobile phase solvents, and adduct ions expected to be detected under these conditions; detecting peaks of adduct ions contained in data detected by the mass spectrometer; and determining the molecular weight of sample molecules based on the detected mass-to-charge ratios of the adduct ions.

In one feature of this method, the database portion holds information about ionization methods, detection polarities used by the mass spectrometer, mobile phase solvents, adduct ions expected to be detected under these conditions, and their names or appellations in such a way that at least one of these items can be added or rewritten.

In another feature of this method, the detection of the peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by a measuring system.

In a further feature of this method, the mass spectrum is created by a soft ionization method.

In yet another feature of this method, the soft ionization method is one selected from the group consisting of API, CI, FAB, MALDI, and FD.

In still another feature of this method, the API is one of ESI and APCI used as an interface between a liquid chromatograph and the mass spectrometer.

First apparatus for analyzing a mass spectrum in accordance with the present invention comprises: an input portion for entering information about an ionization method, a detection polarity used by a mass spectrometer, and a mobile phase solvent; a database portion having registered information about ionization methods, detection polarities used by the mass spectrometer, mobile phase solvents, and adduct ions having the possibility of being detected under these conditions, for comparison with the information entered from the input portion; and a control portion for detecting peaks of adduct ions within data detected by the mass spectrometer based on the results of the comparison between the information entered from the input portion and the information registered in the database portion and determining the molecular weight of sample molecules based on the detected mass-to-charge ratios of the adduct ions.

In one feature of this apparatus, the database portion holds information about ionization methods, detection polarities used by the mass spectrometer, mobile phase solvents, adduct ions expected to be detected under these conditions, and their names or appellations in such a way that at least one of these items can be added or rewritten.

In another feature of this apparatus, detection of the peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by the measuring system.

In a further feature of this apparatus, the mass spectrum is created by a soft ionization method.

In yet another feature of this apparatus, the soft ionization method is one selected from the group consisting of API, CI, FAB, MALDI, and FD.

In still another feature of this apparatus, the API is one of ESI and APCI used as an interface between a liquid chromatograph and the mass spectrometer.

A second method of analyzing a mass spectrum in accordance with the present invention comprises the steps of: comparing entered information about an ionization method, a detection polarity used by a mass spectrometer, and a mobile phase solvent with information registered in a database about ionization methods, detection polarities used by the mass spectrometer, mobile phase solvents, and adduct ions expected to be detected under these conditions; detecting peaks of adduct ions contained in data detected by the mass spectrometer; deleting the peaks of the adduct ions from the detected data; adding peaks of a given height to peak positions of molecular ions corresponding to the adduct ions; and then searching the detected data against the database.

In one feature of this method, the database holds information about ionization methods, detection polarities used by the mass spectrometer, mobile phase solvents, adduct ions expected to be detected under these conditions, and their names or appellations in such a way that at least one of these items can be added or rewritten.

In another feature of this method, the detection of the peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by the measuring system.

In a further feature of this method, when an operation for deleting the peaks of the adduct ions from the detected data and adding the peaks of the given height to the peak positions of the molecular ions corresponding to the adduct ions is performed, deletion and addition of isotope peaks are performed simultaneously.

In a still further feature of this method, the given height corresponds to the total sum of the peaks of the deleted adduct ions.

In an additional feature of this method, the mass spectrum is created by a soft ionization method.

In yet another feature of this method, the soft ionization method is one selected from the group consisting of API, CT, FAB, MALDI, and FD.

In still another feature of this method, the API is one of EST and APCI used as an interface between a liquid chromatograph and the mass spectrometer.

A second apparatus for analyzing a mass spectrum in accordance with the present invention comprises: an input portion for entering information about an ionization method, a detection polarity used by a mass spectrometer, and a mobile phase solvent; a database portion holding registered information about ionization methods, detection polarities used by the mass spectrometer, mobile phase solvents, and adduct ions having the possibility of being detected under these conditions, for comparison with the information entered from the input portion; and a control portion for detecting peaks of adduct ions within data detected by the mass spectrometer based on the results of the comparison between the information entered from the input portion and the information registered in the database portion, deleting the peaks of the adduct ions from the detected ions, adding peaks of a given height to peak positions of molecular ions corresponding to the adduct ions, and searching the detected data against the database.

In one feature of this method, the database portion holds information about ionization methods, detection polarities used by the mass spectrometer, mobile phase solvents, adduct ions expected to be detected under these conditions, and their names or appellations in such a way that at least one of these items can be added or rewritten.

In another feature of this apparatus, the detection of the peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by the measuring system.

In a further feature of this apparatus, when an operation for deleting the peaks of the adduct ions from the detected data and adding the peaks of the given height to the peak positions of molecular ions corresponding to the adduct ions is performed, deletion and addition of isotope peaks are performed simultaneously.

In yet another feature of this apparatus, the given height corresponds to the total sum of the deleted adduct ions.

In a still further feature of this method, the mass spectrum is created by a soft ionization method.

In yet another feature of this method, the soft ionization method is one selected from the group consisting of API, CI, FAB, MALDI, and FD.

In still another feature of this method, the API is one of ESI and APCI used as an interface between a liquid chromatograph and the mass spectrometer.

Other objects and features of the invention will appear in the course of the description thereof, which follows.

BRIEF DESCRIPTION OF THE DRAWINGS

FIG. 4 is a table showing a database registered in the database portion of a mass spectral analyzer according to the present invention;

DESCRIPTION OF THE PREFERRED EMBODIMENTS

The preferred embodiments of the present invention are hereinafter described with reference to the accompanying drawings. A method and apparatus permitting one to easily analyze a mass spectrum containing peaks of impurity adduct ions without experience (i.e., the first problem is solved) is first described. In the following description, a spectrum obtained by ionizing a sample by API and detecting the resulting ions by a mass spectrometer is analyzed. The invention can also be applied to a case where a spectrum obtained by ionizing a sample by CI, FAB, MALDI, or FD and detecting the resulting ions by a mass spectrometer.

Figure 3:
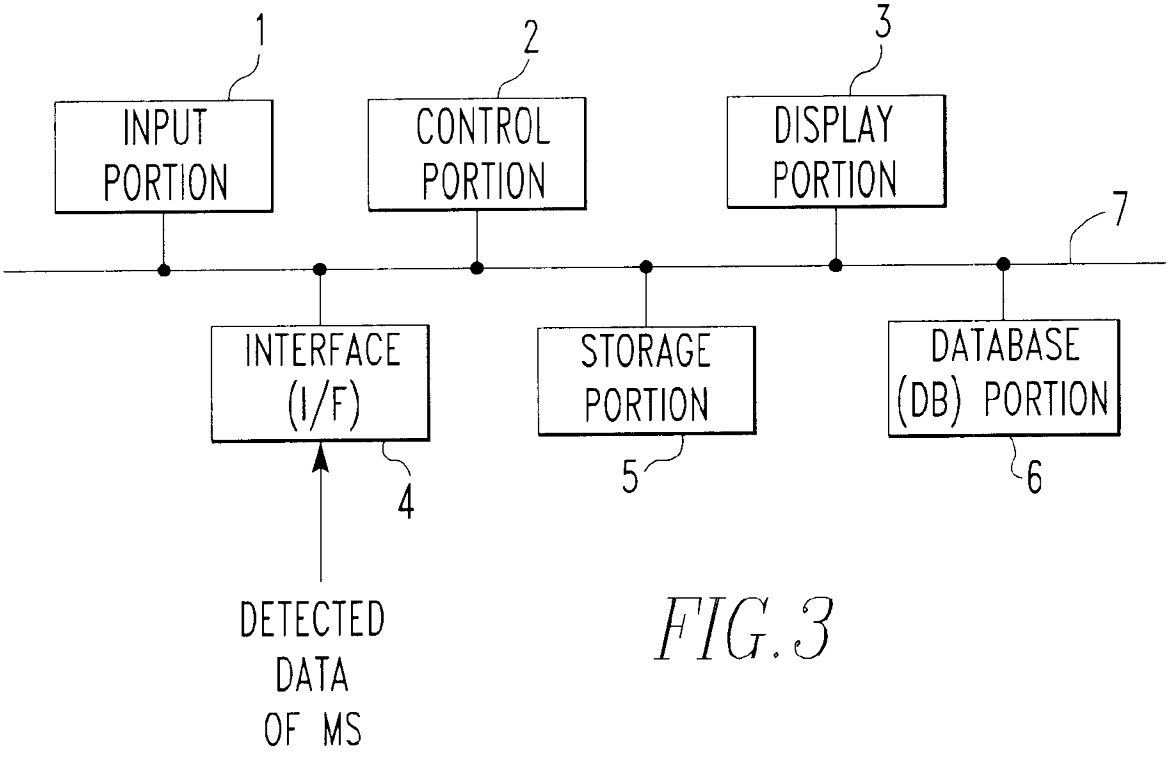
FIG. 3 is a diagram of a mass spectral analyzer according to the present invention.

FIG. 3 shows a mass spectral analyzer according to the present invention. This apparatus has an input portion 1, a control portion 2, a display portion 3, an interface (I/F) 4, a storage portion 5, a database (DB) portion 6, and a data bus 7.

Each portion of the mass spectral analyzer shown in FIG. 3 is first described briefly. In this apparatus, the input portion 1, control portion 2, display portion 3, interface 4, storage portion 5, and database portion 6 are interconnected by the data bus 7.

The input portion 1 is made up of a keyboard and a mouse. The control portion 2 is composed of an MPU and its peripheral circuitry. The MPU controls the whole operation of the spectral analyzer. Software for executing processing of spectral analysis (described later) and software for executing processing for updating the database are loaded into the control portion 2.

The display portion 3 is a monitor consisting of a color CRT or color LCD capable of displaying a visible image on its viewing screen. The input portion 1, control portion 2, and display portion 3 together constitute a graphical user interface (GUI).

The interface 4 is used to accept data detected by the mass spectrometer via a communication line. In this embodiment, it is assumed that the data detected by the mass spectrometer is accepted via the interface 4 from the communication line. Obviously, the data detected by the mass spectrometer may be first stored in an appropriate storage medium, such as a flexible disk, and then read in from the disk. The data accepted by the interface 4 is first stored in the storage portion 5 under control of the control portion 2.

The storage portion 5 serves to hold the data which is accepted after detection by the mass spectrometer, as well as various kinds of data obtained by spectral analyses.

A database is stored in the database portion 6. In this database, adduct ions expected to be detected under various combinations of ionization methods, polarities of ions detected by the mass spectrometer, and kinds of mobile phase solvents are written. Moreover, information about the adduct ions is written. In this embodiment, the difference in mass-to-charge ratio between adducts is used as the information about the adduct ions. Specifically, when two are selected from adduct ions written in the field of "Adduct Ions", the difference in mass-to-charge ratio (m/z) between the adducts of the two adduct ions is used as the information about the adduct ions.

FIG. 4 shows one example of the structure of the database. FIG. 4 is a table illustrating a method of discerning peaks originating from adduct ions and judging the correct molecular weights of compounds appearing in the mass spectrum from the m/z values of the adduct ions. The items of the table of FIG. 4 are as follows. "Ionization Method" is a column of items indicating whether the used ionization method is ESI or APCI. "Polarity" is a column of items indicating the polarity of charge of ions detected by the mass spectrometer. "+" indicates detection of positive ions, while "-" indicates detection of negative ions. Held in the column of items "Mobile Phase Solvent" are kinds of LC mobile phase solvents used immediately prior to ionization of sample molecules.

What are held in the "Adduct Ions" column are kinds of adduct ions that are highly likely to be detected by the mass spectrometer judged from the combinations of ionization methods, polarities, and mobile phase solvents. For example, according to the top row of the table of FIG. 4, if the ionization method is ESI, the polarity is positive, and the mobile phase solvent is methanol, three kinds (i.e., protonated ions $[M+H]^+$, impurity adduct ions $[M+NH_4]^+$, and other impurity adduct ions $[M+Na]^+$) are highly likely to be detected by the mass spectrometer. As shown in this table, it is roughly known empirically what adduct ions can be detected when a given ionization method is used and which of positive and negative polarities is used in detecting ions.

Stored in the column "m/z Difference" are the values of differences in m/z between adduct ions that are empirically found to be observed. For instance, with respect to the top row of the table of FIG. 4, three kinds of adduct ions are highly likely to be observed. Therefore, there are three combinations in selecting two out of these adduct ions. The differences in m/z between adducts are written for each of the three combinations. In particular, "17" is the difference in m/z between a proton and ammonium ion, "22" is the difference in m/z between proton and sodium ion, and "5" is the difference in m/z between ammonium and sodium ions. The same convention applies to other rows. Where there are only two adduct ions that are highly likely to be observed, only the difference in m/z between these two kinds of adduct ions is written.

A method of discerning peaks originating from adduct ions in accordance with the present invention consists of making a decision as to whether the value of the interval between two certain peaks observed in a high mass region under the above-described given combination of ionization method, polarity, and mobile phase solvent is coincident with any one of differences in m/z held in the rows that satisfy the measuring conditions of the given ionization method, polarity, and mobile phase solvent of the table of FIG. 4. If there is an agreement, the two peaks are judged to have originated from the adduct ions written in the table of FIG. 4. In this way, it is possible to identify the adducts of the adduct ions. Therefore, the value of the mass-to-charge ratio of the original molecular ions $[M]^+$, i.e., the molecular weight of the compound of interest, can be determined by subtracting the value of the mass-to-charge ratio of the adduct itself from the value of the mass-to-charge ratio of the peak judged to have originated from the adduct ions. This method is quite effective because it can be implemented if there are two adduct ions, at minimum, producing peaks.

For example, under the measuring conditions shown in the top row of the table of FIG. 4 (i.e., the ionization method is ESI, the polarity is positive, and the mobile phase solvent is methanol), if the value of the interval between two certain peaks observed in the high mass region of the mass spectrum is 17, the peaks can be ascribed to the peak of ammonium ion adduct ions $[M+NN_4]^+$and the peak of protonated ions $[M+H]^+$in turn from the higher mass region side. The m/z value of the original molecular ions $[M]^+$, i.e., the true molecular weight of the compound of interest, can be determined by subtracting the mass-to-charge ratio of ammonium ion and the mass-to-charge ratio of proton from the mass-to-charge ratios of the peaks, respectively.

Obviously, the contents of the columns "Ionization Method", "Polarity", and "Mobile Phase Solvent" are not limited to those shown in FIG. 4. If necessary, other contents may be added at any time, or the contents of the columns "Ionization Method", "Polarity", and "Mobile Phase Solvent" may be replaced by other contents. Furthermore, if the existence of a new adduct ion species is observed during measurement, information about it may be added at any time to the items of "Adduct Ions" and "Difference in m/z".

Figure 1:
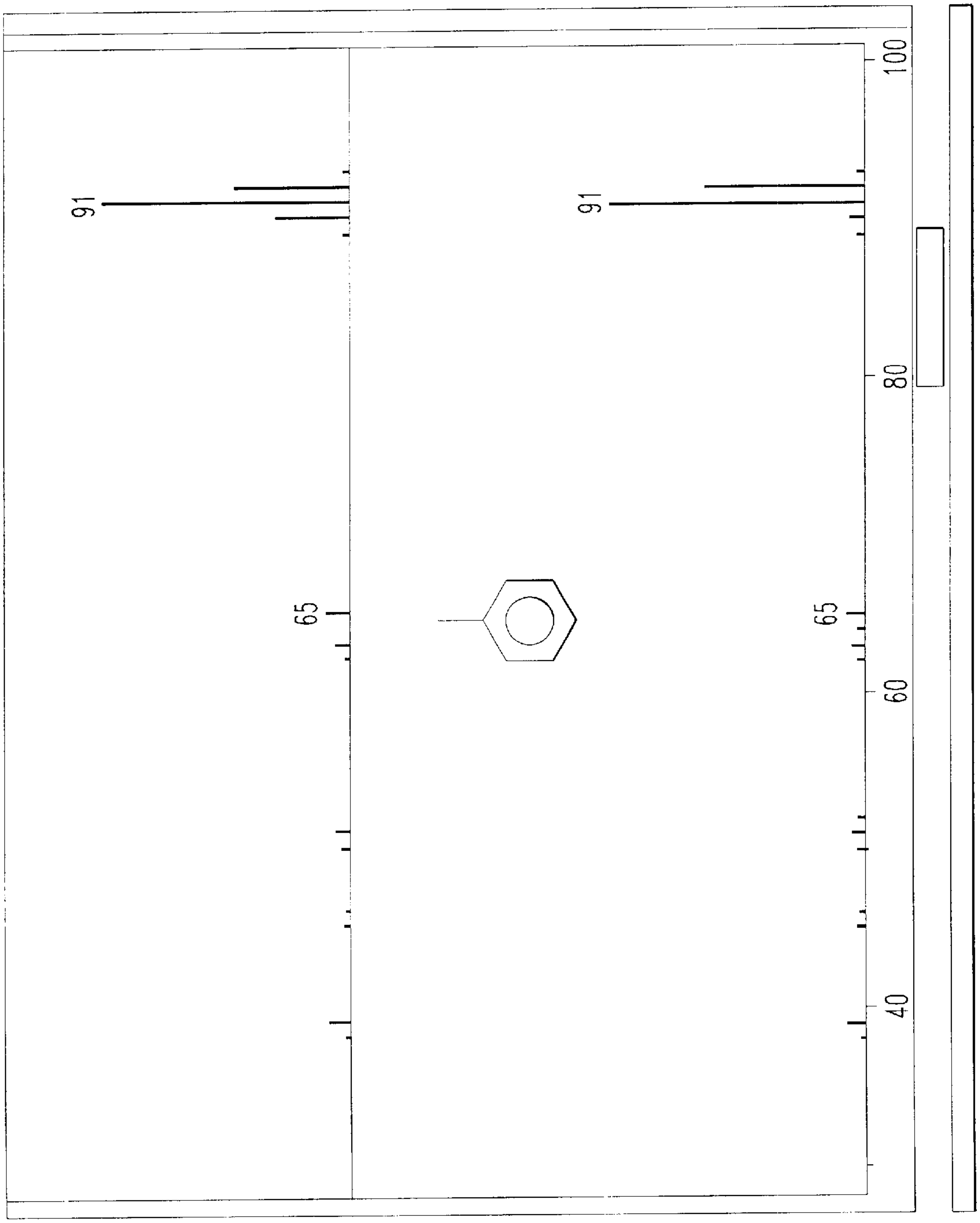
FIG. 1 is a mass spectrum of toluene.
Figure 2A:
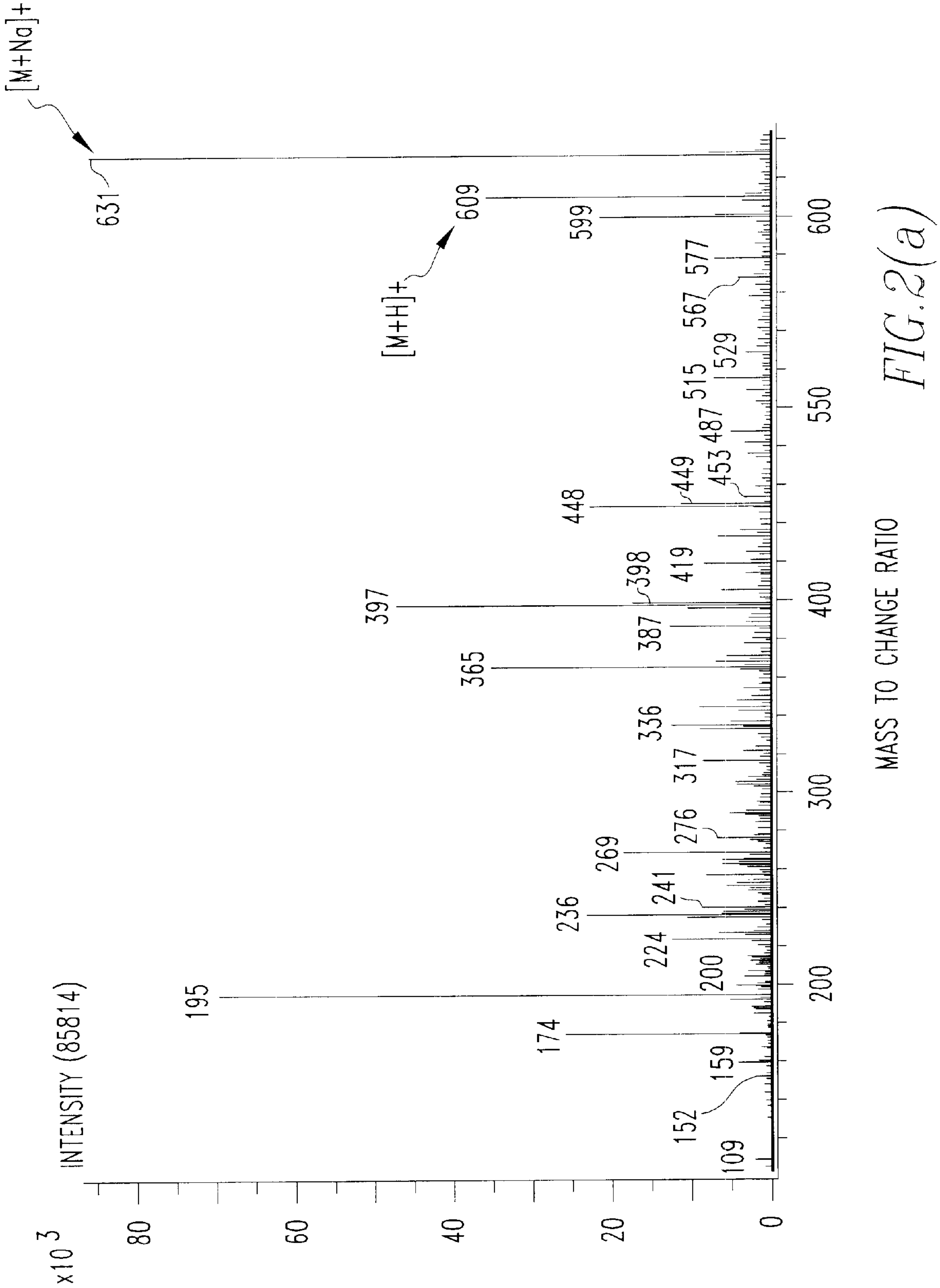
FIG. 2 is a mass spectrum of reserpine.
Figure 2B:
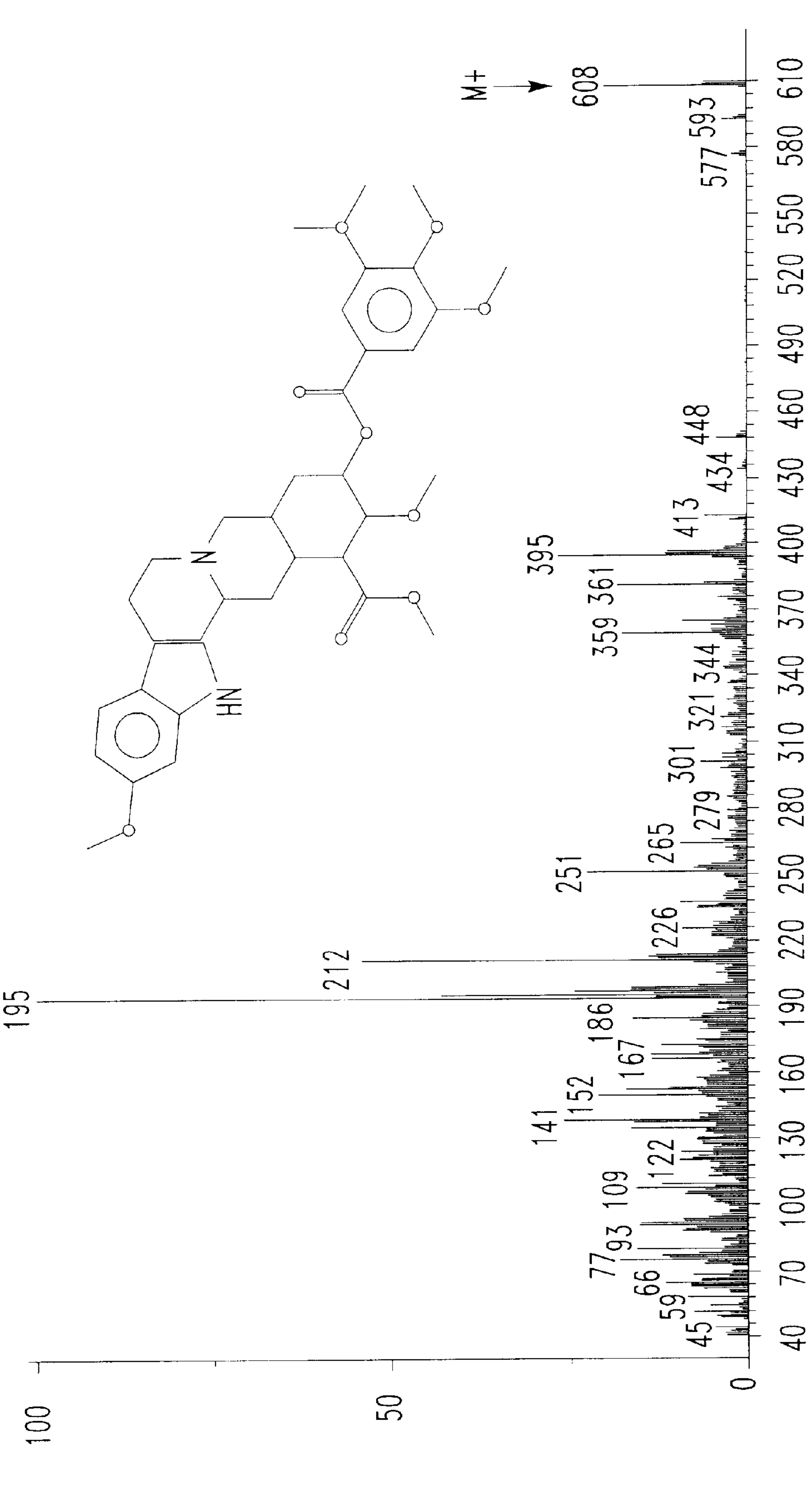
Figure 5:
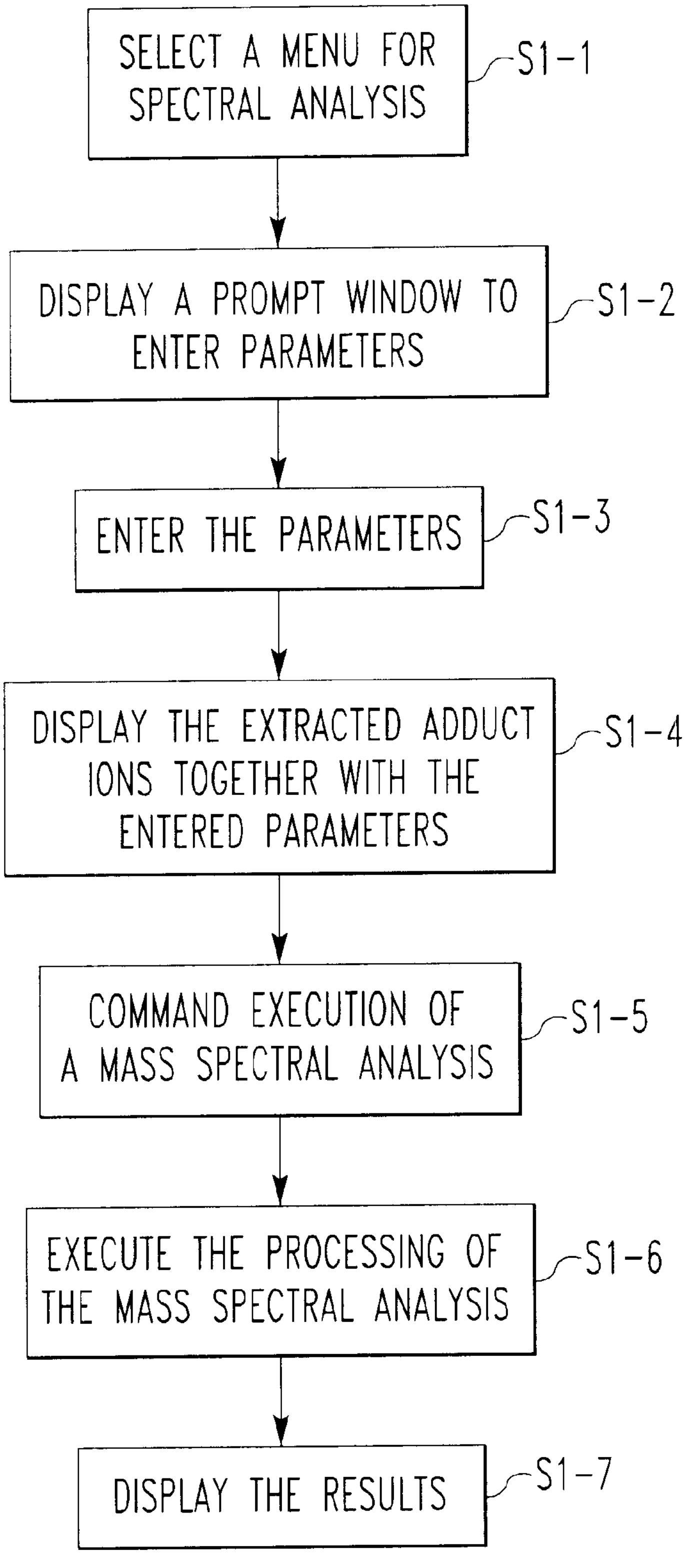
FIG. 5 is a flowchart illustrating a method of analyzing a mass spectrum in accordance with the present invention.

The operation of the mass spectral analyzer of FIG. 1 having the database that has the structure and usage as described thus far is described in further detail below together with a method of analyzing a mass spectrum, by referring to the flowchart of FIG. 5.

The operator selects a menu for spectral analysis from the input portion 1 (step S11). If this menu for spectral analysis is selected, the control portion 2 displays a prompt window on the display portion 3 to prompt the operator to enter parameters (step S1–2). The parameters include the kind of the ionization method, the kind of polarity (i.e., whether positive or negative ions are detected by the mass spectrometer), the kind of the mobile phase solvent, and the threshold value used in removing background noise from the data detected by the mass spectrometer. The threshold value may be a fixed value. In this embodiment, it is entered by the operator.

The operator then enters the parameters prompted to be entered, using the input portion 1 (step S1–3). With respect to the ionization method, polarity, and mobile phase solvent, the operator may directly key in characters indicating the parameters. With respect to the threshold value, he/she may enter numerical values. Alternatively, designations or appellations written in the database regarding the parameters of ionization method, polarity, mobile phase solvent, and threshold value may be displayed in an option menu. The operator may choose out of the options.

When these parameters are entered, the control portion 2 searches the database registered in the database portion 6. Specifically, the control portion 2 searches the database for the combination of ionization method, detection polarity, and mobile phase solvent and extracts adduct ions corresponding to the combination. The extracted adduct ions are displayed on the display portion 3 together with the entered parameters (step S1–4). This permits the operator to recognize what adduct ions are likely to bring out their peaks in the spectrum created based on the data detected by the mass spectrometer.

Then, the operator performs a manual operation on the input portion 1 to command execution of a mass spectral analysis (step S1–5). As a result, the control portion 2 executes the processing of the mass spectral analysis (step S1–6). Of course, data detected by the mass spectrometer is accepted at any time up to this point. The instant when the data is accepted may vary according to the circumstance. The processing of step S1–1 of FIG. 5 may be carried out after the data is accepted. Alternatively, the data may be accepted between the steps S1–4 and S1–5 of FIG. 5. The step S1–4 may be omitted at any time. Control may immediately proceed to the step S1–5 after entering given parameters in step S 1–3.

The processing of mass spectral analysis of step S1–6 is performed by the control portion 2. During this processing of spectral analysis, the items of m/z differences in the database of FIG. 4 are used. In this embodiment, the ionization method is APCI, the detection polarity is positive, and the mobile phase solvent is acetonitrile. That is, this is the case of the second row from the top in FIG. 4.

First, the control portion 2 extracts that portion of detected spectral data which is in excess of the threshold value and removes the background noise. Then, the control portion 2 makes a decision as to whether there are two peaks which provide m/z difference coincident with the value written in the m/z difference column of the database (in this case, the difference in m/z between ammonium ion and proton). In practice, the operator takes notice of one peak. The value written in the m/z difference column is subtracted from the m/z of that peak. A decision is made as to whether there is a peak in the position of the difference in m/z.

Where there are two such peaks (referred to as a peak pair), it is judged that a sample molecule has been detected. Where there is no such peak pair, it is judged that no sample molecule has been detected. Let p1 and p2 be the mass-to-charge ratios of the two peaks of the pair (p2>p1). Let k be the value written in the m/z difference item. If the relation $$p2-p1=k \tag{1}$$

satisfied, it is judged that a sample molecule has been detected. Where it is judged that a sample molecule has been detected, the control portion 2 determines the difference in m/z between the peak having the lower m/z value and proton as the molecular weight of the sample molecule, because, in this case, one of the two peaks which has the lower m/z value is a peak of protonated ion.

Where the peak pair has been successfully detected, the molecular weight of the sample molecule is generally determined in the manner described below. The m/z value of that of the two adducts used for obtaining an m/z difference for detection of the sample molecule which has a larger m/z value (in this case, m/z value of ammonium ions) is subtracted from the m/z value of the peak of larger m/z value. Alternatively, the m/z value of that of the two adducts used for obtaining an m/z difference for detection of the sample molecule which has a smaller m/z value (in this case, m/z value of proton) is subtracted from the m/z value of one of the two peaks which has a smaller m/z value.

The control portion 2 performs the processing described thus far for the peaks in the spectrum in turn.

Where there are three kinds of adduct ions as in the top row of the database of FIG. 4, three values are written in the "m/z Difference" column as mentioned previously. If there are two peaks which give an m/z difference coincident with any one of the three values, it is judged that a sample molecule has been detected. If not so, it is judged that no sample molecule has been detected because impurity adduct ions registered in the "Adduct Ions" items of the database are not all detected by the mass spectrometer. The same theory applies where four or more kinds of adduct ions are registered.

The processing of spectral analysis has been described thus far. When the processing of spectral analysis ends, the control portion 2 writes the results of the analysis into the storage portion 5 and displays the results on the display portion 3 (step S1–7), thus completing the sequence of processing.

Figure 6A:
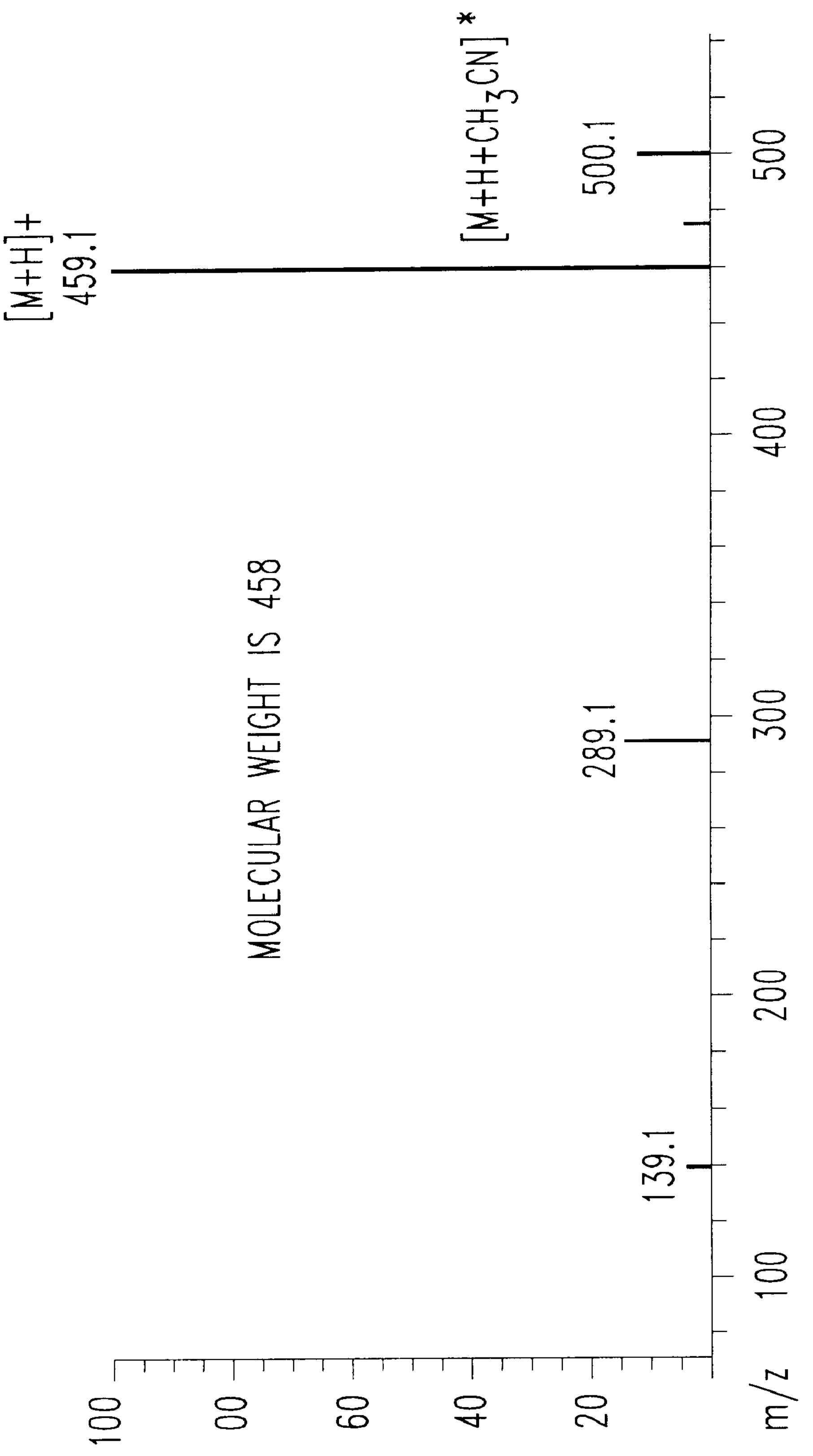
FIGS. 6(*a*), 6(*b*), and 6(*c*) show one example of representation of the results of analysis of a mass spectrum.

With respect to the display of the results of analysis, where a sample molecule is successfully detected and its m/z value is determined, the molecular weight of the sample molecule may be alphanumerically displayed. Alternatively, as shown in FIG. 6(*a*), the analyzed spectrum may be displayed, an adduct ion may be shown at the peak arising from the adduct ion, and the molecular weight of the sample molecule may be displayed. In the example of spectrum of FIG. 6(*a*), green tea component was ionized by APCI using acetonitrile as a mobile phase solvent. Positive ions were detected by the mass spectrometer. In the spectrum, peaks of protonated ions $[M+H]^+$and impurity adduct ions $[M+H+CH_3CN]^+$appear. The molecular weight of the sample molecule has been determined to be 458.

Where no sample molecule (no ion peak) has been detected, a display is provided to inform the operator that no sample molecule has been detected and to urge the operator to modify the analysis conditions, such as modification of the detection polarity as shown in FIG. 6(*b*). In this way, remeasurement is urged.

Furthermore, where only one ion peak has been detected instead of the peak pair detection, for example, the following message, "Single peak was detected at the position of m/z=500. Judging from the analysis condition, the peak may be assigned to $[M+H]^+$or $[M+H+CH_3CN]^+$. To determine the molecular weight, please measure again after changing polarity condition or after selecting the other analysis conditions." is displayed on the display portion as shown in FIG. 6(*c*).

The method of spectral analysis has been described thus far. Updating of the database is described next. The database registered in the database portion 6 holds adduct ions and m/z difference values between the adducts of adduct ions for various combinations of ionization methods, detection polarities, and mobile phase solvents. In some cases, special mobile phase solvents other than those registered in the database may be used.

Figure 7:
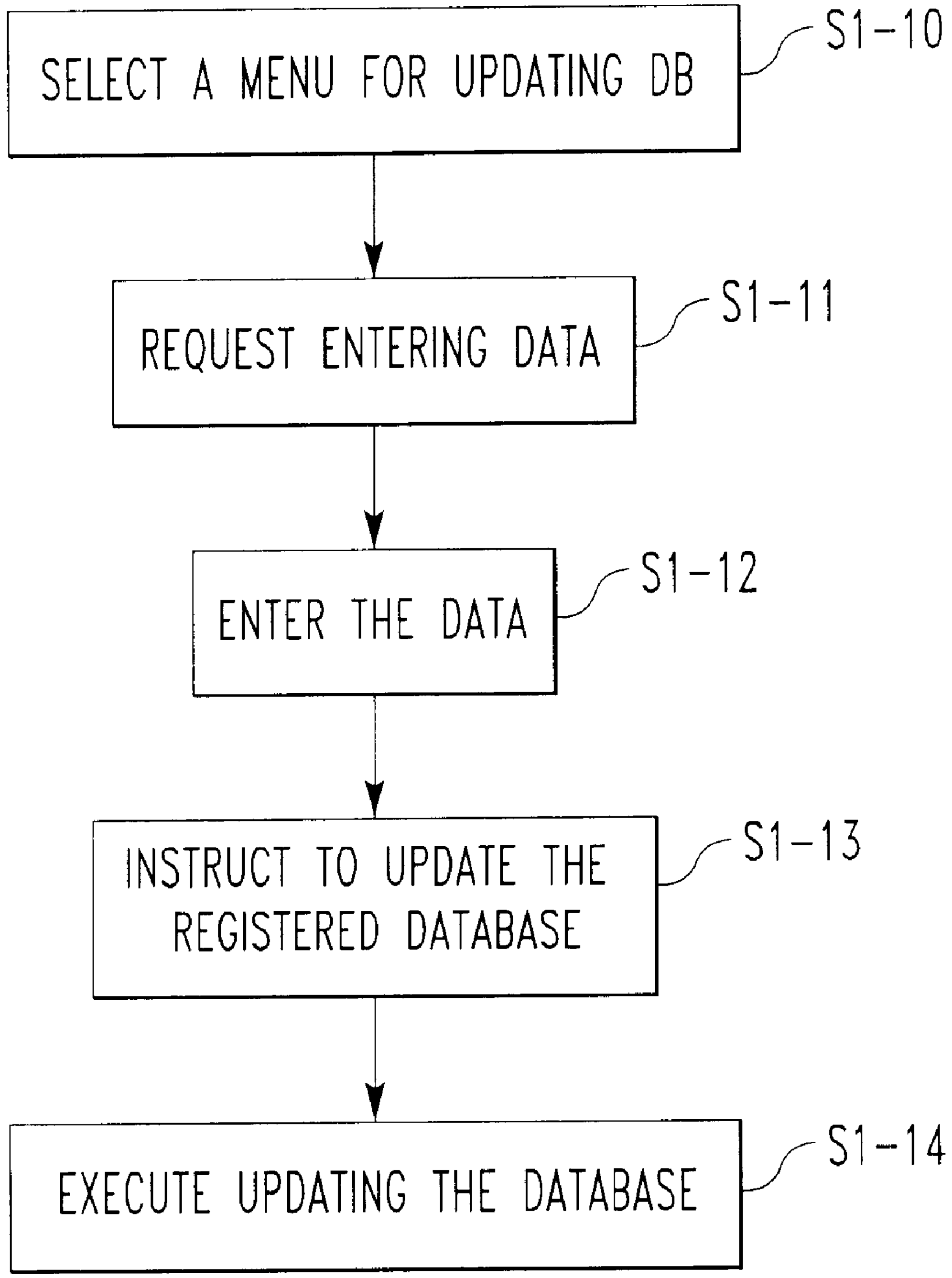
FIG. 7 is a flowchart illustrating a method of updating a database registered in the database portion of the mass spectral analyzer according to the present invention.

Accordingly, the apparatus is preferably so designed that as the need arises, the operator can update the database by modifying or adding adduct ions that might be detected and m/z differences between the adducts of the adduct ions at the various combinations of ionization methods, detection polarities, and mobile phase solvents. Furthermore, it is desired that the operator can modify the titles or appellations of these items or add new titles or appellations. This function is useful in a case when sample liquid droplets are heated within an evaporation tube to desolvate the droplets during an APCI process, for example, the sample is thermally decomposed, and the resulting fragment ions are attached to the sample molecules. For these purposes, a menu for updating the database is prepared in the spectral analyzer. The processing for updating the database is described below by referring to FIG. 7.

Where the database (DB) is updated, the operator selects a menu for updating the database from the input portion 1 (step S1–10). If this menu is selected, the control portion 2 displays a prompt window on the display portion 3 to urge the operator to enter data (step S1–11). Then, the operator enters data to be registered in the database (step S1–12).

The entered data is regarding all of the items of ionization method, detection polarity, adduct ions, and m/z difference. Furthermore, if necessary, the titles or appellations of these items themselves may be modified or new titles or appellations may be added. When items of data are entered, the operator gives an instruction to update the registered database (step S1–13). Consequently, the control portion 2 updates the database in the database portion 6 by the input data (step S1–14) and ends the sequence of processing.

Since the apparatus is designed as described thus far, information about adduct ions corresponding to various combinations of ionization methods, detection polarities, and mobile phase solvents is registered in the database of the spectral analyzer. When an ionization method, a detection polarity used by the mass spectrometer, and a mobile phase solvent are entered, the detected data is automatically analyzed according to the input data and the information about the adduct ions held in the database. The peaks of adduct ions within data detected by the mass spectrometer are detected. The molecular weight of the sample molecule is determined according to the m/z values of the adduct ions.

Therefore, if the spectrum contains peaks of impurity adduct ions, the analysis is performed automatically. In consequence, the analyst is not required to have much experience or skill, unlike in the past. Furthermore, the same analysis results are obtained regardless of the analyst's experience. In addition, the database can be updated as the need arises. This offers convenience to the user.

It is to be understood that the present invention is not limited to the above embodiment but rather may be modified variously. For example, only two kinds of ionization methods (i.e., ESI and APCI) are registered in the database of FIG. 4. Data about other ionization methods, such as CI, FAB, MALDI, and FD, may be similarly registered. That is, if adduct ions and m/z difference values between two adduct ions which are selected from adduct ions written in the items of adduct ions are registered, data detected by performing a mass analysis using such an ionization method may be easily analyzed automatically.

Where the molecular weight of the sample molecule can be forecast, the forecast value may be entered as a parameter. Peaks close to the forecast value may be subjected to the aforementioned spectral analysis. This can shorten the time required for spectral analysis.

The second problem that the present invention tackles with is next described. That is, an apparatus and method for searching the mass spectral pattern of the sample molecule against an existing GC/MS database is described, the sample molecule having a mass-to-charge ratio that has been found by the method described above.

A second mass spectral analyzer that is similar to the analyzer already described in connection with FIG. 3 is described. Referring again to FIG. 3, this second mass spectral analyzer has an input portion 1 for entering an ionization method, a detection polarity used by the mass spectrometer, and a mobile phase solvent, a display portion 3 consisting of a display device, such as a color CRT or color LCD capable of displaying a visible image on its viewing screen, an interface (I/F) 4 for accepting data detected by the mass spectrometer via a communication line, a storage portion 5 for storing various kinds of data including the accepted data and the results of a spectral analysis, and a database (DB) portion 6. Ionization methods, detection polarities used by the mass spectrometer, mobile phase solvents, and information about adduct ions that are likely to be detected under these conditions are registered in the database portion 6. Information entered from the input portion is compared with the information registered in the database portion. The present embodiment is characterized in that the apparatus further includes a control portion 2 having functions of detecting the peaks of adduct ions from data detected by the mass spectrometer according to the results of comparisons between the information entered from the input portion 1 and the information registered in the database portion 6, deleting the peaks of the adduct ions from the detected data, adding peaks of a given height to the peak positions of molecular ions corresponding to the adduct ions, and then searching the database for the detected data.

Figure 8:
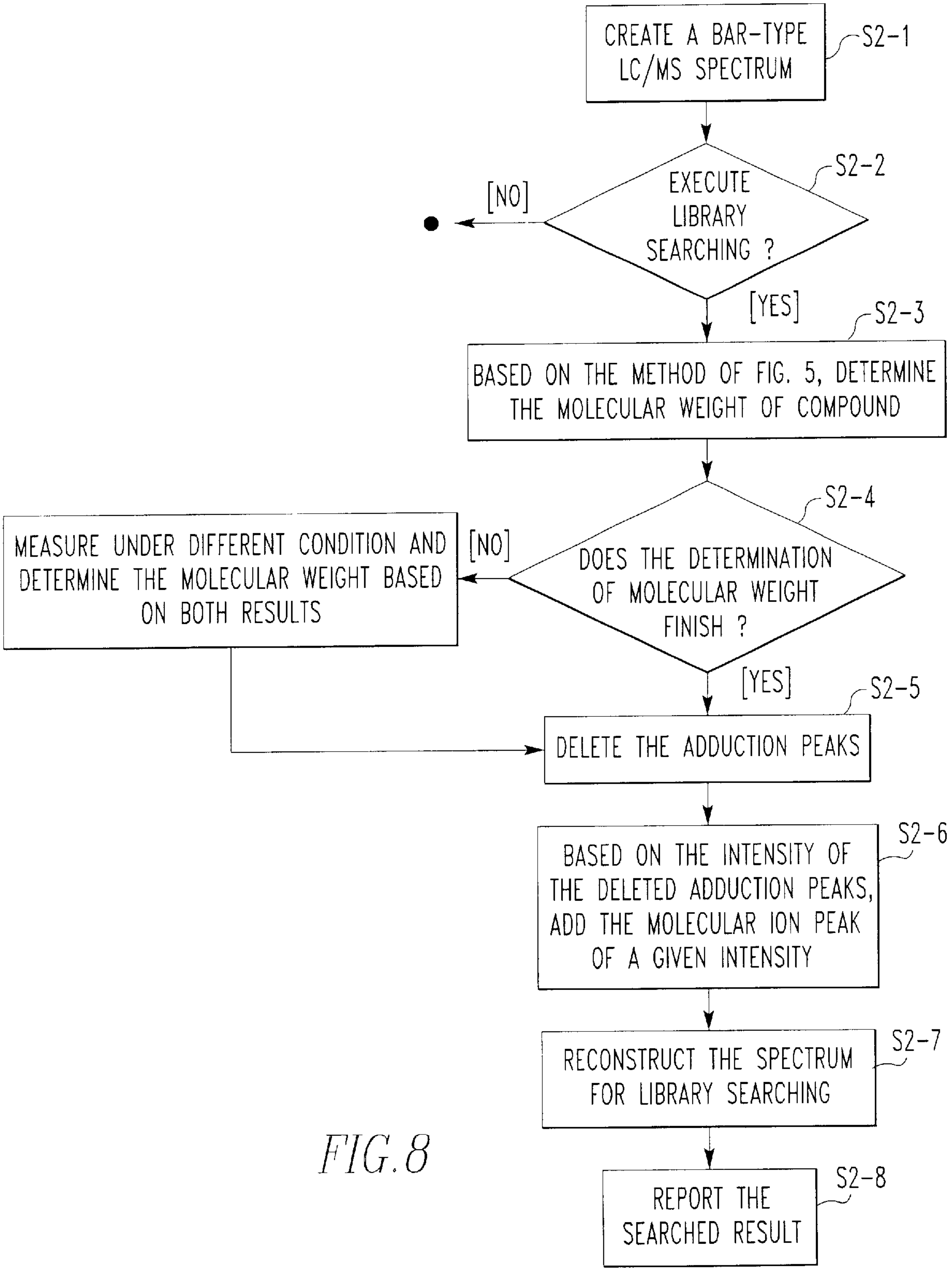
FIG. 8 is a flowchart illustrating another method of analyzing a mass spectrum in accordance with the present invention.

FIG. 8 is a flowchart illustrating a method of analyzing a mass spectrum in accordance with the present invention. This method is described below by referring to FIG. 8.

First, the operator measures an LC/MS mass spectrum by a soft ionization method as described above. The spectrum is data processed to create a bar-type spectrum (step S2–1). After obtaining the bar-type spectrum by the soft ionization method, a decision is made as to whether the spectrum is searched against a commercially available GC/MS general-purpose library, or database (step S2–2). If the result of the decision is NO, the inventive method of mass spectral analysis is not implemented. On the other hand, if the result of the decision is YES, control goes to the next step.

In the next step S2–3, peaks originating from adduct ions observed when an LC/MS mass spectrum is measured by the soft ionization method are extracted, and the correct molecular weight of the compound of interest appearing in the mass spectrum is judged from the mass-to-charge ratios of the peaks of the extracted adduct ions by the method described in detail in connection with FIGS. 4, 5, and 6(*a*), 6(*b*), and 6(*c*).

If the operation for judging the molecular weight of the compound of interest ends in step S2–3, control goes to step S2–4, where a decision is made as to whether the judgment of the molecular weight has been made successfully. If the result of the decision is YES, control proceeds to step S2–5, where two peaks judged to be adduct ions are deleted from the observed mass spectrum. On the other hand, if the result of the decision is NO, a mass spectrum is measured under different measuring conditions. The molecular weight of the compound of interest is judged by taking account of both present and previous spectra. As a result, if the molecular weight is judged, two peaks judged to have originated from adduct ions are deleted from the observed mass spectrum (step S2–5).

After deleting the two peaks judged to have originated from adduct ions from the observed mass spectrum, a peak of a given intensity are added to the position judged to be the intrinsic molecular weight (step S2–6). This is an operation for bringing the observed mass spectral pattern closer to mass spectral patterns held in the existing GC/MS general-purpose database including molecular ion $[M]^+$producing a spectral pattern that is observed as a peak having a maximum m/z value. Thus, the data search is facilitated. As a result of this operation, pseudo-spectra used for database searching and made closer to the spectral patterns held in the existing GC/MS general-purpose database can be reconstructed (step S2–7).

In step S2–6, the intensity of the pseudo-peak added to the mass position judged to be the intrinsic molecular weight may be arbitrary. If possible, the intensity is preferably made equal to the total sum of the intensities of peaks deleted from the observed mass spectrum.

In the operation of step 2–5 for deleting the peaks of the adduct ions and in the operation of step 2–6 for adding a peak to the m/z position of the compound of interest, isotope peaks of the compound of interest may be deleted or added along with the former peaks. The decision as to whether it is an isotope peak of the compound of interest is made, depending on whether the value of deviation from the peak position of the compound of interest is coincident with the value of the difference in mass number between successive isotopes and on whether the ratios of the intensities of the peaks of the compound of interest are natural abundance ratios.

For example, a compound including one chlorine atom has both an isotope having a mass number of 35 and an isotope having a mass number of 37 in natural abundances of 75.53% and 24.47%, respectively. Therefore, a peak of mass number M and a peak of mass number M+2 are observed to be mixed at a ratio of about 3:1. Where some of the peaks are judged to be peaks of adduct ions, a higher efficiency will be obtained by performing deletion and addition together with remaining isotope-derived peaks which are not always judged to be peaks of adduction ions.

This theory can also be applied to a compound including plural chlorine atoms. For example, a compound including two chlorine atoms is observed to have a peak of mass number M, a peak of mass number M+2, and a peak of mass number M+4 at a ratio of about 9:6:1. Where some of these peaks are judged to be peaks of adduct ions, a higher efficiency will be obtained by performing deletion and addition together with the remaining isotope-derived peaks which are not always judged to be peaks of adduct ions.

This theory can also be applied to all halogen elements besides chlorine and the other elements which have a specific isotope pattern. For compounds including such elements, isotope patterns are important for identification of compounds. Therefore, mass spectra can be reconstructed quite effectively by deleting isotope-derived peaks at the same time and then adding them at the same time.

The hit rate for the existing GC/MS general-purpose database is enhanced using mass spectra reconstructed for data searching in this way. Then, the database is searched for the spectrum. The results of the search are reported (step S2–8).

These functions are previously imparted to the control portion 2 of FIG. 3. Consequently, a mass spectral analyzer can be obtained which is capable of searching the existing GC/MS general-purpose database for a complex mass spectrum containing the peaks of adduct ions, the mass spectrum being obtained from LC/MS.

Figure 9A:
FIG. 9 shows the results of analyses of mass spectra of reserpine performed by a method according to the present invention for analyzing mass spectra.
Figure 9B:
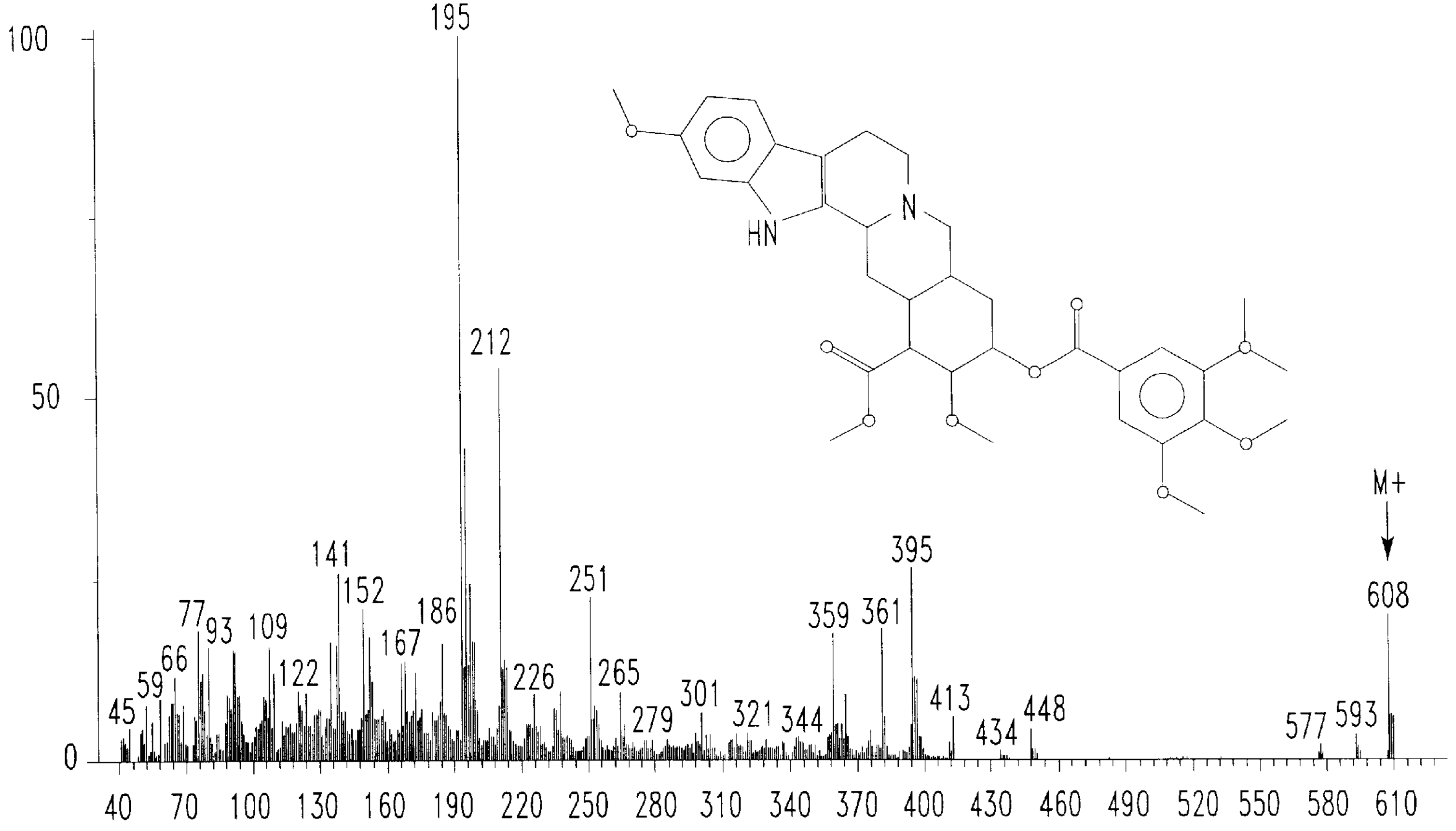

One example of result of analysis performed by this method of mass spectral analysis is shown in FIG. 9. As can be seen from FIG. 9, a mass spectrum of reserpine obtained by LC/MS is reconstructed based on the method of FIG. 8. This enhances the degree of coincidence with mass spectra of reserpine created by EI and held in the general-purpose database. As a result, the hit rate of the spectrum is improved.

The application of this search method is not limited to mass spectra produced by ESI and APCI as shown in FIG. 4. This method can also be effectively used to search a library for positive-ion FAB spectra, negative-ion FAB spectra, positive-ion CI spectra, negative-ion CI spectra, positive-ion MALDI spectra, negative-ion MALDI spectra, positiveion FD spectra, and negative-ion FD spectra.

As described thus far, the inventive method and apparatus for analyzing mass spectra makes it possible to make a decision as to whether peaks appearing in a mass spectrum originate from adducts arising from the mobile phase solvent or impurities contained in it, by comparing the m/z difference between the peaks with m/z values of adducts previously registered in a database. Consequently, a mass spectrum containing peaks of impurity adduct ions can be easily analyzed without skill, unlike in the past where experience and knowledge have been required.

Furthermore, a library search is done after judging the peaks of adduct ions from peaks constituting a mass spectrum, deleting the peaks of the adduct ions from the mass spectrum, and adding peaks of a given height to peak positions corresponding to molecular ions corresponding to the adduct ions. Therefore, an LC/MS mass spectrum obtained by a soft ionization method can be analyzed based on a commercially available, general-purpose GC/MS database constructed by EI. The hit rate can be enhanced.

Having thus described my invention with the detail and particularity required by the Patent Laws, what is desired protected by Letters Patent is set forth in the following claims.

The invention claimed is:

1. A method of analyzing a mass spectrum, comprising the steps of:

comparing entered information about an ionization method, a detection polarity used by a mass spectrometer, and a mobile phase solvent with information registered in a database portion about ionization methods, detection polarities used by the mass spectrometer, mobile phase solvents, and adduct ions expected to be detected under these conditions;

detecting peaks of adduct ions contained in data detected by the mass spectrometer; and determining the molecular weight of sample molecules based on detected mass-to-charge ratios of the adduct ions.

2. A method of analyzing a mass spectrum as set forth in claim 1, wherein said database portion holds information about ionization methods, detection polarities used by the mass spectrometer, mobile phase solvents, adduct ions expected to be detected under these conditions, and their names or appellations in such a way that at least one of these items can be added or rewritten.

3. A method of analyzing a mass spectrum as set forth in any one of claims 1 and 2, wherein detection of peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by a measuring system.

4. A method of analyzing a mass spectrum as set forth in any one of claims 1 and 2, wherein said mass spectrum is created by a soft ionization method.

5. A method of analyzing a mass spectrum as set forth in claim 4, wherein said soft ionization method is one selected from the group consisting of API, CI, FAB, MALDI, and FD.

6. A method of analyzing a mass spectrum as set forth in claim 5, wherein said API is one of ESI and APCI used as an interface between a liquid chromatograph and the mass spectrometer.

7. Apparatus for analyzing a mass spectrum, comprising:

an input portion for entering information about an ionization method, a detection polarity used by a mass spectrometer, and a mobile phase solvent;

a database portion having registered information about ionization methods, detection polarities used by the mass spectrometer, mobile phase solvents, and adduct ions having the possibility of being detected under these conditions, for comparison with the information entered from the input portion; and a control portion for detecting peaks of adduct ions within data detected by the mass spectrometer based on results of the comparison between the information entered from the input portion and the information registered in the database portion and determining the molecular weight of sample molecules based on detected mass-to-charge ratios of the adduct ions.

8. Apparatus for analyzing a mass spectrum as set forth in claim 7, wherein said database portion holds information about ionization methods, detection polarities used by the mass spectrometer, mobile phase solvents, adduct ions expected to be detected under these conditions, and their names or appellations in such a way that at least one of these items can be added or rewritten.

9. Apparatus for analyzing a mass spectrum as set forth in any one of claims 7 and 8, wherein detection of peaks of said adduct ions is performed based on whether the difference in mass-to-charge ratio (m/z) between at least two peaks observed in a high m/z region is coincident with the difference in mass-to-charge ratio between at least two species of adduct ions having the possibility of being observed by the measuring system.

10. Apparatus for analyzing a mass spectrum as set forth in any one of claims 7 and 8, wherein said mass spectrum is created by a soft ionization method.

11. Apparatus for analyzing a mass spectrum as set forth in claim 10, wherein said soft ionization method is one selected from the group consisting of API, CI, FAB, MALDI, and FD.

12. Apparatus for analyzing a mass spectrum as set forth in claim 11, wherein said API is one of ESI and APCI used as an interface between a liquid chromatograph and the mass spectrometer.

13. A method of analyzing a mass spectrum, comprising the steps of:

comparing entered information about an ionization method, a detection polarity used by a mass spectrometer, and a mobile phase solvent with information registered in a database about ionization methods, detection polarities used by the mass spectrometer, mobile phase solvents, and adduct ions expected to be detected under these conditions;

detecting peaks of adduct ions contained within data detected by the mass spectrometer;

deleting the peaks of the adduct ions from the detected data;

adding peaks of a given height to peak positions of molecular ions corresponding to the adduct ions; and then searching the detected data against said database.

14. A method of analyzing a mass spectrum as set forth in claim 13, wherein said database holds information about ionization methods, detection polarities used by the mass spectrometer, mobile phase solvents, adduct ions expected to be detected under these conditions, and their names or appellations in such a way that at least one of these items can be added or rewritten.

15. A method of analyzing a mass spectrum as set forth in any one of claims 13 and 14, wherein detection of peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by the measuring system.

16. A method of analyzing a mass spectrum as set forth in any one of claims 13 and 14, wherein when an operation for deleting the peaks of the adduct ions from the detected data and adding the peaks of the given height to the peak positions of molecular ions corresponding to the adduct ions is performed, deletion and addition of isotope peaks are performed simultaneously.

17. A method of analyzing a mass spectrum as set forth in any one of claims 13 and 14, wherein the given height corresponds to the total sum of the peaks of the deleted adduct ions.

18. A method of analyzing a mass spectrum as set forth in any one of claims 13 and 14, wherein the mass spectrum is created by a soft ionization method.

19. A method of analyzing a mass spectrum as set forth in claim 18, wherein said soft ionization method is one selected from the group consisting of API, CI, FAB, MALDI, and FD.

20. A method of analyzing a mass spectrum as set forth in claim 19, wherein said API is one of ESI and APCI used as an interface between a liquid chromatograph and the mass spectrometer.

21. Apparatus for analyzing a mass spectrum, comprising:

an input portion for entering information about an ionization method, a detection polarity used by a mass spectrometer, and a mobile phase solvent;

a database portion having a database holding registered information about ionization methods, detection polarities used by the mass spectrometer, mobile phase solvents, and adduct ions having the possibility of being detected under these conditions, for comparison with the information entered from the input portion; and a control portion for detecting peaks of adduct ions within data detected by the mass spectrometer based on the results of the comparison between the information entered from the input portion and the information registered in the database portion, deleting the peaks of the adduct ions from the detected ions, adding peaks of a given height to peak positions of the molecular ions corresponding to the adduct ions, and searching the detected data against the database.

22. Apparatus for analyzing a mass spectrum as set forth in claim 21, wherein the database portion holds information about ionization methods, detection polarities used by the mass spectrometer, mobile phase solvents, adduct ions expected to be detected under these conditions, and their names or appellations in such a way that at least one of these items can be added or rewritten.

23. Apparatus for analyzing a mass spectrum as set forth in any one of claims 21 and 22, wherein detection of peaks of the adduct ions is performed based on whether the difference in mass-to-charge ratio (m/z) between at least two peaks observed in a high m/z region is coincident with the difference in mass-to-charge ratio between at least two species of adduct ions having the possibility of being observed by the measuring system.

24. Apparatus for analyzing a mass spectrum as set forth in any one of claims 21 and 22, wherein when an operation for deleting the peaks of the adduct ions from the detected data and adding the peaks of the given height to the peak positions of molecular ions corresponding to the adduct ions is performed, deletion and addition of isotope peaks are performed simultaneously.

25. Apparatus for analyzing a mass spectrum as set forth in any one of claims 21 and 22, wherein said given height corresponds to the total sum of the deleted adduct ions.

26. Apparatus for analyzing a mass spectrum as set forth in any one of claims 21 and 22, wherein said mass spectrum is created by a soft ionization method.

27. Apparatus for analyzing a mass spectrum as set forth in claim 26, wherein said soft ionization method is one selected from the group consisting of API, CI, FAB, MALDI, and FD.

28. Apparatus for analyzing a mass spectrum as set forth in claim 27, wherein said API is one of ESI and APCI used as an interface between a liquid chromatograph and the mass spectrometer.

* * * * *